US010701171B2

(12) United States Patent
Agarwal et al.

(10) Patent No.: US 10,701,171 B2
(45) Date of Patent: Jun. 30, 2020

(54) MESSAGE CACHING FOR A NODE IN A WIRELESS MESH NETWORK

(71) Applicant: QUALCOMM Incorporated, San Diego, CA (US)

(72) Inventors: Vishal Agarwal, Ramnagar (IN); Jagdeep Kumar Hans, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 16/133,544

(22) Filed: Sep. 17, 2018

(65) Prior Publication Data
US 2020/0092390 A1  Mar. 19, 2020

(51) Int. Cl.
*H04W 72/04* (2009.01)
*H04L 29/08* (2006.01)
*H04W 84/18* (2009.01)

(52) U.S. Cl.
CPC ......... *H04L 67/2842* (2013.01); *H04W 72/04* (2013.01); *H04W 84/18* (2013.01)

(58) Field of Classification Search
CPC .... H04L 67/2842; H04W 72/04; H04W 84/18
USPC ....................................................... 370/329
See application file for complete search history.

(56) References Cited

U.S. PATENT DOCUMENTS

| 8,583,978 | B2 | 11/2013 | Shaffer et al. |
| 9,025,461 | B2 | 5/2015 | Krishnamurthy et al. |
| 9,426,020 | B2 | 8/2016 | Vasseur et al. |
| 2008/0291855 | A1 | 11/2008 | Bata et al. |
| 2017/0171064 | A1 | 6/2017 | Alexandru et al. |
| 2017/0230784 | A1 | 8/2017 | Kwon et al. |
| 2019/0199627 | A1* | 6/2019 | Di Marco ........... H04W 40/246 |
| 2019/0200193 | A1* | 6/2019 | Bae ......................... H04W 4/50 |
| 2020/0029278 | A1* | 1/2020 | Mallat .................... H04W 4/80 |

FOREIGN PATENT DOCUMENTS

WO    WO-2018017009 A1    1/2018

OTHER PUBLICATIONS

Bluetooth blog Aug. 29, 2018.*
Bluetooth Mesh Networking: Friendship Aug. 24, 2017.*

(Continued)

*Primary Examiner* — Faisal Choudhury
(74) *Attorney, Agent, or Firm* — Arent Fox, LLP and Qualcomm, Incorporated

(57) ABSTRACT

In an aspect of the disclosure, a method, a computer-readable medium, and an apparatus are provided. The apparatus may transmit a smart friend request message to a set of nodes in the wireless mesh network. The set of nodes may be associated with a friend feature that may include maintaining one or more element messages intended for the first node when the first node is in a low power state. Each of the one or more element messages intended for the first node may include an element address corresponding to an element at the first node. The smart friend request message may indicate a hierarchy of element addresses to maintain at the second node. The apparatus may operate in the low power state during which the second node maintains the one or more element messages for the first node based at least in part on the hierarchy of element addresses.

20 Claims, 12 Drawing Sheets

(56) References Cited

OTHER PUBLICATIONS

Mahdian M., et al., "MinDelay: Low-Latency Forwarding and Caching Algorithms for Information-Centric Networks", Oct. 2017, 10 pages.

International Search Report and Written Opinion—PCT/US2019/045515—ISA/EPO—Oct. 18, 2019.

* cited by examiner

MESSAGE CACHING FOR A NODE IN A WIRELESS MESH NETWORK

BACKGROUND

Field

The present disclosure relates generally to communication systems, and more particularly, to a mechanism for message caching in a wireless mesh network (WMN).

Background

A WMN may include a distributed network of mesh nodes (e.g., wireless routers, cellular base stations, access points, relay nodes, wireless sensors, etc.) that are organized in a mesh topology. Mesh nodes may be used to relay communications from point A to point B within the WMN. Using the distributed network of mesh nodes, signals may be carried from point A to point B by splitting the distance (e.g., from point A to point B) into a series of hops between intermediate mesh nodes. Intermediate mesh nodes not only boost/regenerate the signal, but cooperatively pass the signal from point A to point B by making forwarding decisions using knowledge of the mesh topology (e.g., the spatial relationship of the mesh nodes within the WMN).

As compared to other types of communication networks, WMNs may offer certain advantages such as increased reliability. For example, when a mesh node in the WMN malfunctions, the remaining mesh nodes may still route signals from point A to point B using an updated mesh topology that no longer includes the malfunctioning mesh node. In other words, WMN may be able to "self-form" and "self-heal" when a mesh node in the WMN malfunctions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first node in a wireless mesh network. The first node may include a plurality of elements, and each of the plurality of elements may be associated with a different element address. In certain configurations, the apparatus may transmit a smart friend request message to a set of nodes in the wireless mesh network. In certain aspects, the set of nodes being associated with a friend feature that may include maintaining one or more element messages intended for the first node when the first node is in a low power state. In certain other aspects, each of the one or more element messages intended for the first node including an element address corresponding to one of the plurality of elements at the first node. In certain other aspects, the smart friend request message may indicate at least in part a hierarchy of element addresses such that a second node maintains the one or more elements messages for the first node based at least in part on the hierarchy of element addresses. The apparatus may operate in the low power state during which the second node maintains the one or more element messages for the first node based at least in part on the hierarchy of element addresses.

In certain other configurations, the apparatus may be a first node in a wireless mesh network. The apparatus may receive a smart friend request message from a second node in the wireless mesh network. In certain aspects, the first node may be associated with a friend feature that includes one or more element messages intended for the second node when the second node is in a low power state. In certain other aspects, each of the element messages intended for the second node may include an element address corresponding to one of a plurality of elements at the second node. In certain other aspects, the smart friend request message may indicate at least in part a hierarchy of element addresses such that the first node maintains the one or more elements messages for the second node based at least in part on the hierarchy of element addresses. The apparatus may maintain the one or more element messages for the second node based at least in part on the hierarchy of element addresses.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
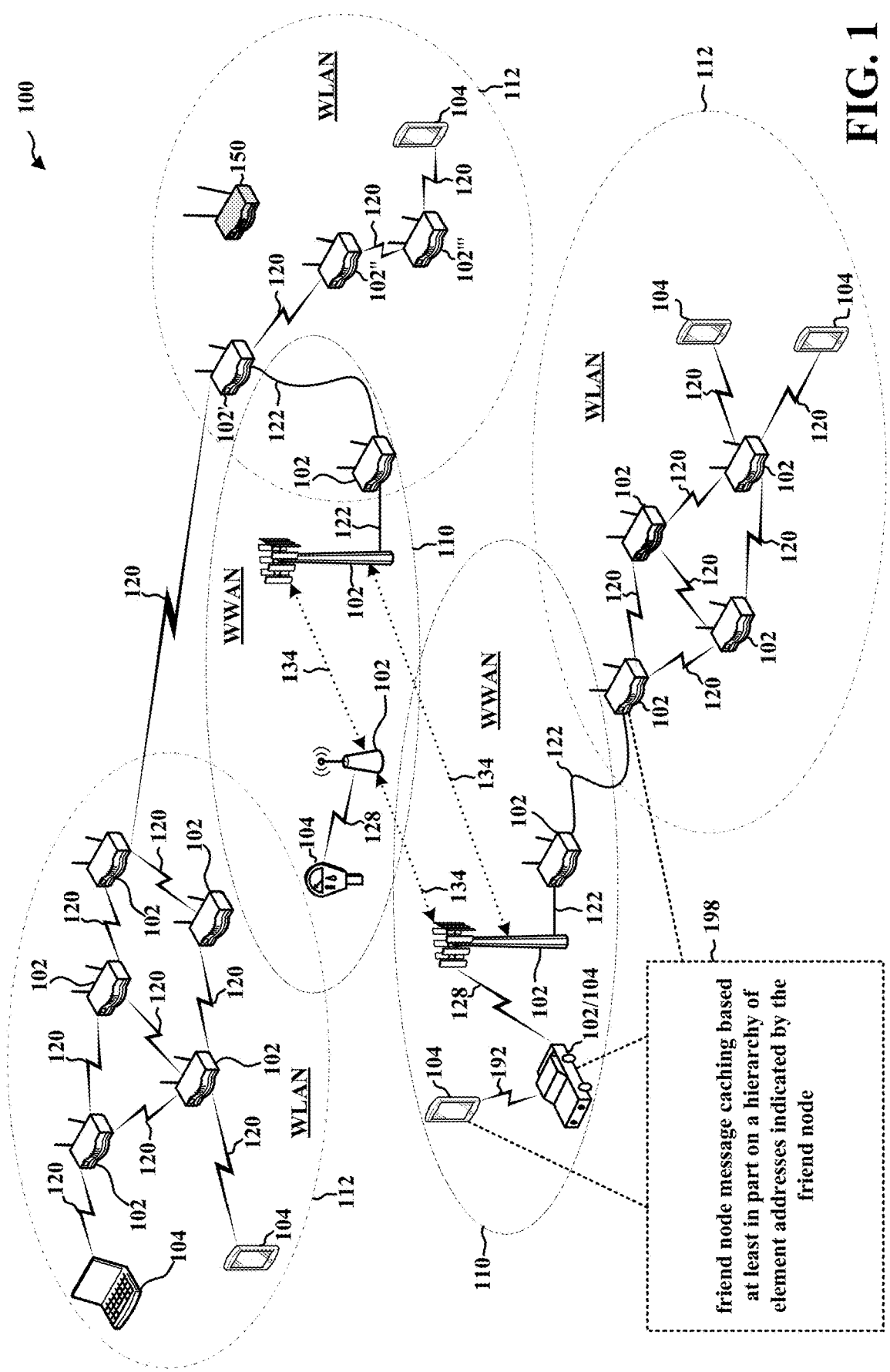
FIG. 1 is a diagram illustrating an example of a WMN.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WMN 100 in accordance with certain aspects of the disclosure. The WMN 100 may comprise one or more wireless wide area networks (WWANs) 110 and/or one or more wireless local area networks (WLANs) 112 that communicate with one another. Each WWAN 110 and WLAN 112 in the WMN 100 may include mesh nodes 102 that receive, transmit, relay, repeat, boost, etc., signals from/to other mesh node(s) 102, and/or from/to mesh client devices 104. Each mesh node 102 may comprise a transmitter chain and a receiver chain, each of which may in turn comprise a plurality of components associated with signal transmission and reception (e.g., processors, modulators, multiplexers, demodulators, demultiplexers, antennas, etc.), as will be appreciated by one skilled in the art.

Examples of a mesh node 102 include a base station, a g Node B (gNB) (e.g., a base station configured to operate in millimeter wave (mmW) frequencies and/or near mmW frequencies), a Node B, an evolved Node B (eNB), a Wi-Fi access point (AP), a base transceiver station, a radio base station, a radio transceiver, a transceiver function, a basic service set (BSS), an extended service set (ESS), a satellite, a satellite radio, a vehicle, a smart device, or some other similarly functioning devices. Certain mesh nodes 102 function as a way for mesh client devices 104 to access the WMN 100. Mesh nodes 102 may communicate with one another via a wireless communication link 120, a wired communication link 122, and/or through an evolved packet core (EPC) using a backhaul link 134.

Mesh client devices 104 may be either fixed or mobile, and dispersed throughout the WMN 100. Examples of mesh client devices 104 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similarly functioning device. Some of the mesh client devices 104 may be referred to as Internet of Things (IoT) devices (e.g., parking meter, gas pump, toaster, vehicles, etc.). A mesh client device 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Certain devices 102/104 in the WMN 100 may act as both a mesh node 102 (e.g., relaying signals from another mesh client device 104 to another mesh node 102) and a mesh client device 104.

Each mesh client device 104 may communicate with zero, one, or multiple mesh nodes 102 at any given moment. Each mesh node 102 may communicate with zero, one, or multiple mesh client devices 104 at any given time. Each mesh node 102 may communicate with zero, one, or multiple other mesh nodes 102 at any given time.

When a cellular base station (e.g., gNB, eNB, etc.) is used as a mesh node 102, the wireless communication link(s) 128 between the mesh node 102 and the mesh client device 104 may include uplink (UL) (also referred to as reverse link) transmissions from the mesh client device 104 to the mesh node 102 and/or downlink (DL) (also referred to as forward link) transmissions from the mesh node 102 to the mesh client device 104. The wireless communication link 128 may use multiple-input and multiple-output (MIMO) antenna technology, including spatial multiplexing, beamforming, and/or transmit diversity. The wireless communication link 128 may be through one or more carriers. The mesh node 102/mesh client device(s) 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

When a Wi-Fi router and/or a Wi-Fi AP is used as a mesh node 102, communications between different mesh nodes 102 or between a mesh node 102 and a mesh client device 104 may occur via wireless communication links 120 in a 5 GHz unlicensed spectrum. When communicating in an unlicensed frequency spectrum, the mesh nodes 102/mesh client devices 104 may perform a clear channel assessment (CCA) prior to communicating in order to determine whether the channel is available.

Mesh client devices 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth®, ZigBee®, Wi-Fi based on the IEEE 802.11 standard, Long-Term Evolution (LTE), or 5G New Radio (NR).

According to certain aspects, the WMN 100 may support multi-hop communications in which a first mesh node 102' utilizes a second mesh node 102" as a relay to a third mesh node 102''' (e.g., or a mesh client device 104). For instance, first mesh node 102' may lack sufficient signal strength to transmit to third mesh node 102''', but may have sufficient signal strength to transmit to the second mesh node 102". In addition, first mesh node 102' may determine that second mesh node 102" has sufficient signal strength to transmit to third mesh node 102'''. Here, first mesh node 102' may route a DL communication through second mesh node 102" to third mesh node 102'''. Hence, the second mesh node 102" acts as a relay for the first mesh node 102'.

According to certain other aspects, the WMN 100 may be able to "self-form" and/or "self-heal" when a mesh node 150 within the WMN 100 malfunctions or is no longer a part of the mesh topology. For example, if the third mesh node 102''' typically routes UL communications from a mesh client device 104 to the first mesh node 102' via mesh node 150, the third mesh node 102''' may route UL communications to the first mesh node 102' via the second mesh node 102" when mesh node 150 malfunctions. In other words, an updated topology that no longer includes mesh node 150 may be determined by the WMN 100 in order to continue relaying communications between the third mesh node 102''' and the first mesh node'.

Referring again to FIG. 1, in certain aspects, the mesh node 102/mesh client device 104 may be configured to perform a friend node message caching technique based at least in part on a hierarchy of element addresses indicated by the friend node (198), e.g., as described below in connection with any one of FIGS. 2-11.

Figure 2:
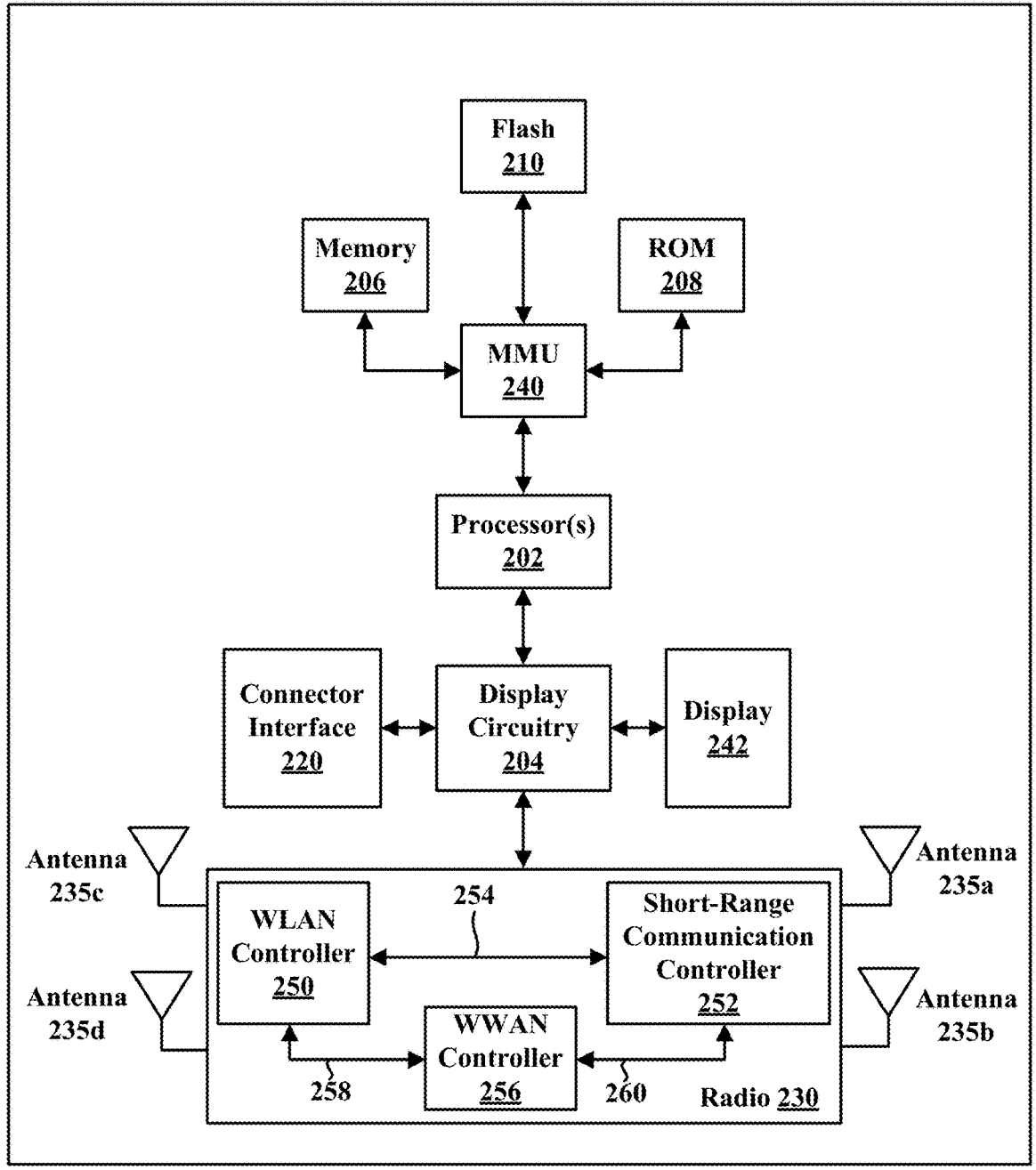
FIG. 2 is block diagram of a wireless device in accordance with certain aspects of the disclosure.

FIG. 2 is block diagram of a wireless device 200 in accordance with certain aspects of the disclosure. The wireless device 200 may correspond to, e.g., one of the mesh nodes 102, and/or one of the mesh client devices 104 described above in connection with FIG. 1.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, Bluetooth®, Bluetooth Low-Energy® (BLE), etc.). The wireless device 200 may include a plurality of antennas 235a, 235b, 235c, 235d, for performing wireless communication with, e.g., wireless devices in a WMN.

In certain aspects, the wireless device 200 may include hardware and software components (a processing element) configured to perform a friend node message caching technique based at least in part on a hierarchy of element addresses indicated by the friend node, e.g., using the techniques described below in connection with any FIGS. 3-11. The wireless device 200 may also comprise wireless mesh firmware or other hardware/software for controlling wireless mesh operations. In addition, the wireless device 200 may store and execute a WLAN software driver for controlling WLAN operations, a short-range communication software driver for controlling short-range communication operations, and/or a WWAN software driver for controlling WWAN operations.

The wireless device 200 may be configured to implement part or all of the techniques described below in connection with any of FIGS. 3-11, e.g., by executing program instructions stored on a memory medium (e.g., a non-transitory computer-readable memory medium) and/or through hardware or firmware operation. In other embodiments, the techniques described below in connection with any of FIGS. 3-11 may be at least partially implemented by a programmable hardware element, such as an field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with a second device in a WMN using a WLAN link using all of the antennas 235a, 235b, 235c, 235d. In certain other configurations, the short-range communication controller 252 may be configured to communicate with at least one second device in a WMN using one or more of the antennas 235a, 235b, 235c, 235d. In certain other configurations, the WWAN controller 256 may be configured to communicate with a second device in a WMN using all of the antennas 235a, 235b, 235c, 235d. The WLAN controller 250, short-range communication controller 252, and/or the WWAN controller 256 may be configured to perform a friend node message caching technique based at least in part on a hierarchy of element addresses indicated by the friend node.

Certain WMNs may be configured to implement message caching for a low power node (LPN). Message caching may refer to a friend node maintaining messages for the LPN while the LPN is in a reduced power state.

For example, an LPN may send a friend request message to a broadcast address (e.g., to all devices in the WMN that may be able to implement message caching for the LPN). The friend request message may indicate the number of elements (e.g., applications) and element addresses associated with the LPN. However, the friend request message may not indicate a hierarchy of the elements and/or element addresses (e.g., a hierarchy based on importance of messages for one or more of the elements and/or element addresses, number of messages, size of messages, etc.), and hence, the friend node may store all incoming messages associated with any of the elements of the LPN.

The LPN may receive multiple friend response messages, and decide with which friend node to establish a friendship with based on, e.g., cache size. The LPN may send a friend request acceptance message to the selected friend node, and the friend node may send a blank message that acts as an acknowledgement (ACK), thereby establishing a message caching friendship between the LPN and the selected friend node.

During full power mode, an LPN may be interested in all the messages for all of the LPN's elements. However, while operating in low power mode, the LPN may or may not be interested in messages for all of the LPN's elements. Once the message caching friendship is established, there may be no way for the LPN to indicate to the friend node which messages to maintain (e.g., messages related to the network may be of higher importance to the LPN than other non-network related messages), e.g., as described below in connection with FIG. 3.

Figure 3:
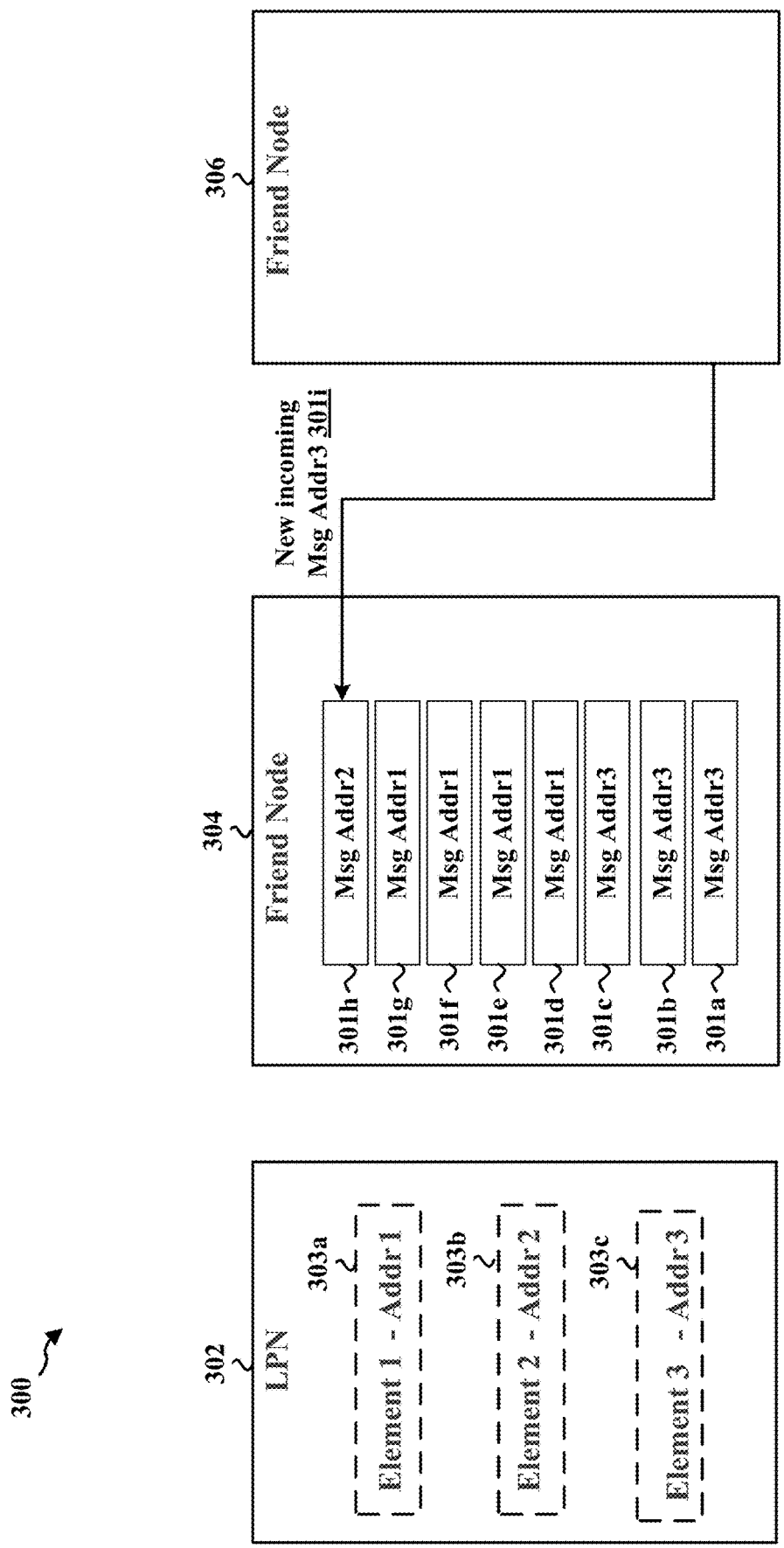
FIG. 3 illustrates a WMN that includes a LPN, a first friend node, and a second friend node in accordance with certain aspects of the present disclosure.

FIG. 3 illustrates a WMN 300 that includes a LPN 302, a first friend node 304, and a second friend node 306 in accordance with certain aspects of the present disclosure. In FIG. 3, the LPN 302 and the first friend node 304 may have an established message caching friendship. In other words, the first friend node 304 may maintain messages for the LPN 302 while the LPN 302 operates in low power mode. As also seen in FIG. 3, the LPN 302 may include a first element 303a, a second element 303b, and a third element 303c. Each of the elements 303a, 303b, 303c may have an associated message address, e.g., address1, address2, address3, respectively.

In certain configurations, the first friend node 304 may have a finite space for the LPN's 302 incoming messages 301a-301h. As seen in the example illustrated in FIG. 3, when the storage space for the LPN's 302 incoming messages is full, the new incoming message 301i may replace another message in the cache (e.g., message 301h may be replaced by new incoming message 301i) that is of higher importance (e.g., the message the LPN 302 is waiting to receive) to the LPN 302 than the new message. In other words, when the LPN 302 transitions from a low power mode to an operational mode and receives the messages 301a-301g and 301i from the first friend node 304, the most important message (e.g., message 301h) may be missing.

Upon transitioning from the low power mode to the operational mode, the LPN 302 may send a polling message to the first friend node 304 for each of the cached messages 301a-301g and 301i, which may consume an undesirable amount of power at the LPN 302 in order to receive cached messages of low importance from the first friend node 304, e.g., as described below in connection with FIG. 4.

Figure 4:
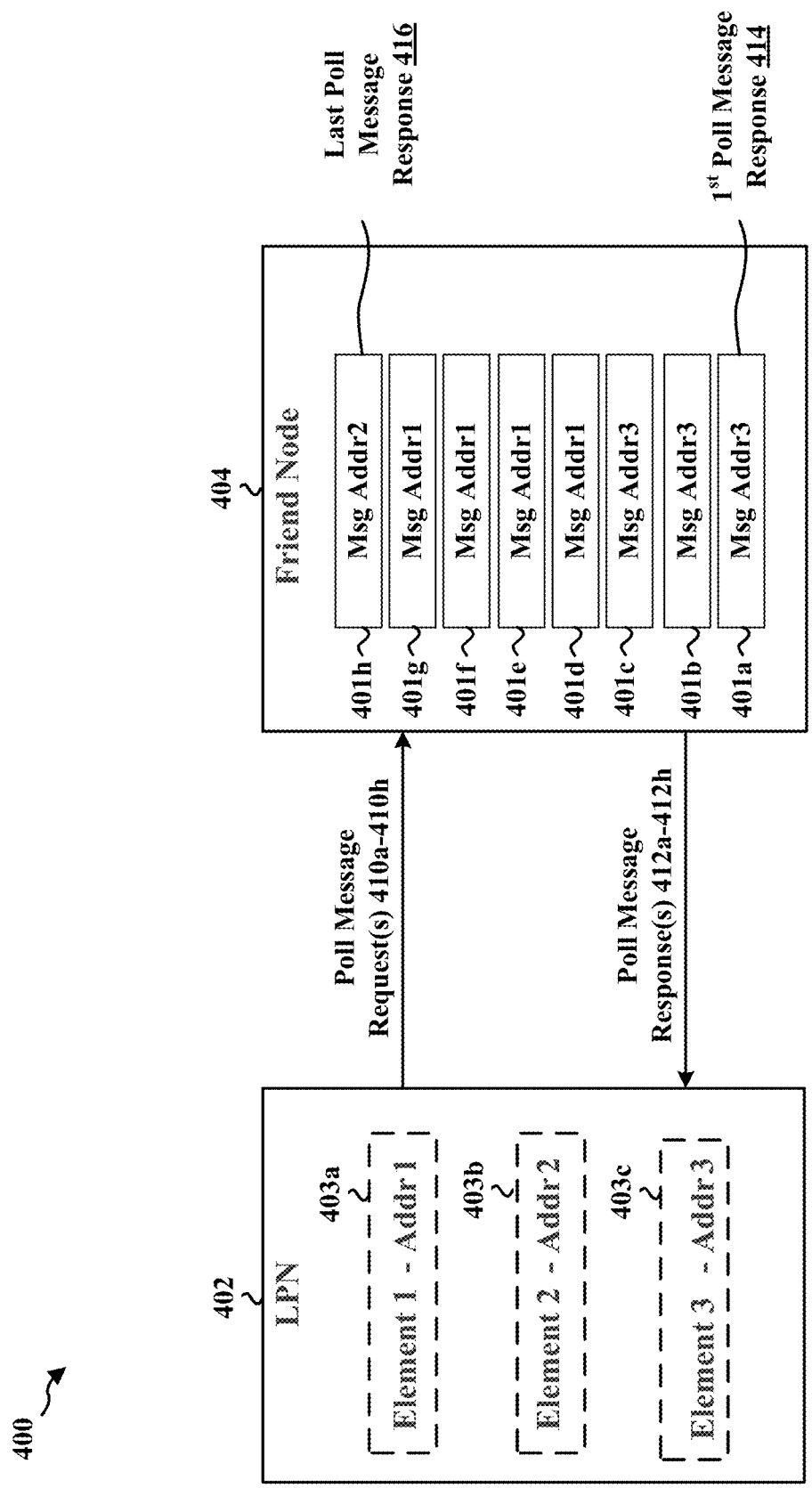
FIG. 4 illustrates a WMN that includes an LPN and a friend node in accordance with certain aspects of the present disclosure.

FIG. 4 illustrates a WMN 400 that includes an LPN 402 and a friend node 404 in accordance with certain aspects of the present disclosure. In FIG. 4, the LPN 402 and the friend node 404 may have an established message caching friendship, and the LPN 402 may have transitioned from the low power mode to the fully operational mode. As also seen in FIG. 4, the LPN 402 may include a first element 403a, a second element 403b, and a third element 403c. Each of the elements 403a, 403b, 403c may have an associated message address, e.g., address1, address2, address3, respectively.

Upon transitioning to the operational mode, the LPN 402 may transmit a polling request message 410a-410h and receive a polling response message 412a-412h after the transmission of each of the polling request messages 410a-410h. In other words, in the example illustrated in FIG. 4, the LPN 402 may transmit eight polling request messages 410a-410h before receiving the cached message of higher importance (e.g., message 401h). For example, the first poll message 414 may be received after sending a first poll request message 410a, and the last poll message 416 may be received after sending the second, third, fourth, fifth, sixth, seventh, and eighth poll request messages 410b-410h.

Transmitting multiple polling request messages prior to receiving the message of higher importance may consume an undesirable amount of power at the LPN 402. In addition, the friend node 404 may be caching messages that are of low importance to the LPN 402, and hence, the friend node 404 may be utilizing storage space unnecessarily.

However, if the LPN 402 were to indicate a hierarchy of message importance (e.g., based one or more of address element address, message size, etc.) in the friendship request message (not illustrated in FIG. 4), the friend node 404 may be able to better utilize the friend node's storage space. In addition, the LPN 402 may be able to receive high importance messages by sending fewer polling request message(s) to the friend node 404, thereby reducing power consumption at the LPN 402 while in an operational mode, e.g., as described below in connection with FIGS. 5-11.

Figure 5:
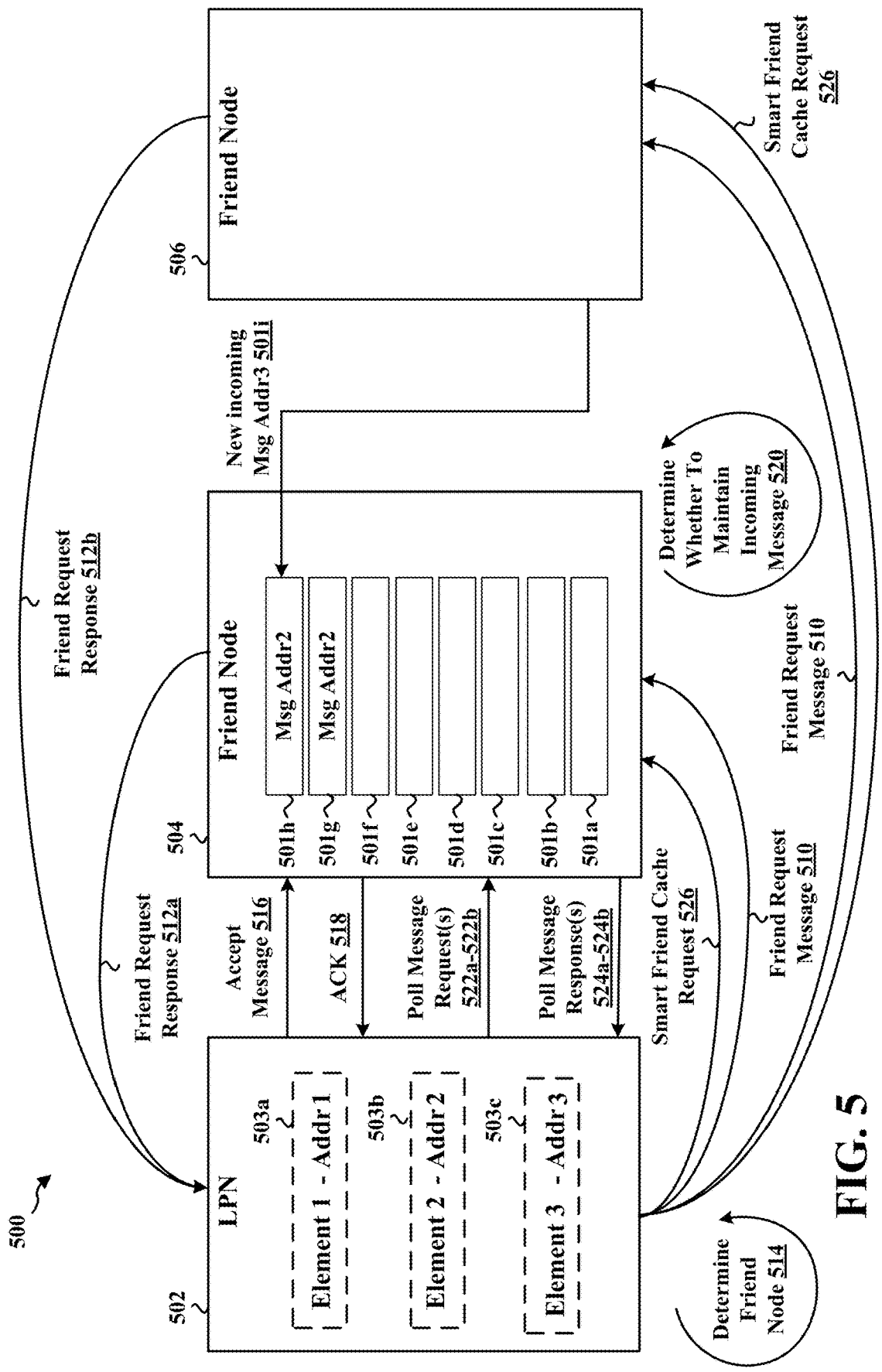
FIG. 5 illustrates a WMN that includes a LPN, a first friend node, and a second friend node in accordance with certain aspects of the present disclosure.

FIG. 5 illustrates a WMN 500 that includes a LPN 502, a first friend node 504, and a second friend node 506 in accordance with certain aspects of the present disclosure. In FIG. 5, the LPN 502 may include a first element 503a, a second element 503b, and a third element 503c. Each of the elements 503a, 503b, 503c may have an associated message address, e.g., address1, address2, address3, respectively. The LPN 502 may correspond to, e.g., the mesh node 102, mesh client device 104, wireless device 200, LPN 302, 402, the second node 1050, the apparatus 702/702'. The first friend node 504 may correspond to, e.g., the mesh node 102, mesh client device 104, the wireless device 200, first friend node 304, friend node 404, second node 750, the apparatus 1002/1002'. The second friend node 506 may correspond to, e.g., the mesh node 102, mesh client device 104, the wireless device 200, second friend node 306, third node 755, 1055.

As seen in FIG. 5, in order to establish a message caching friendship, the LPN 502 may transmit a friendship request message 510. As described above in connection with FIGS. 3 and 4, the friendship request message 510 may be used to establish a friendship with another node in WMN 500. Once a friendship is established, the LPN 502 may send a separate Smart Friend Cache Request 526 to the node with which a friendship has been established (e.g., first friend node 504 in FIG. 5). In certain other implementations, the Smart Friend Cache Request 526 may be used to establish a friendship with one of the other nodes and to indicate a hierarchy of messages to maintain to the first friend node 504 and the second friend node 506. When the Smart Friend Cache Request 526 is used to both establish a friendship and to indicate a hierarchy of importance for maintaining messages, the friendship request message 510 may not be transmitted.

In either of the above implementations, the LPN 502 may transmit the Smart Friend Cache Request 526 to all of the nodes in the WMN 500 that are configured to maintain messages for the LPN 502 based at least in part on a hierarchy of importance (e.g., "Smart Friend Feature") and/ or a number of messages associated with one or more element addresses. In certain aspects, the hierarchy may indicate a single element address for which the LPN 502 wants messages maintained while in a reduced power state. In certain other aspects, the hierarchy may indicate multiple element addresses for which the LPN 502 wants messages maintained while in a reduced power state. In certain other aspects, the hierarchy may indicate a priority of element addresses for which the LPN 502 wants messages maintained while in a reduced power state when a maximum number of messages is maintained by the friend node (e.g., discard address2 message for address1 message).

The Smart Friend Cache Request 526 may include information about the element address(es) for which the friend node may maintain messages, and/or a number of messages to be maintained for each of the element address(es). A non-limiting example of the information that may be included in the Smart Friend Cache Request 526 is seen below in Table 1.

TABLE 1

Information Included in Smart Friend Cache Request

| Field | Size (In octets) | Description |
| --- | --- | --- |
| Number of Address and message sequences | 1 byte | Number of address/ message pairs to follow |
| Address1 | 2 bytes | Caching intended for this address |
| Num_Messages for address1 | 1 byte | Maximum Number of messages to be cached for address1 |
| Address2 | 2 bytes | Caching intended for this address |
| Num_Messages for address2 | 1 byte | Maximum Number of messages to be cached for address2 |

More address and number message entries based on the first byte

In response to the Smart Friend Cache Request 526, the LPN 502 may receive multiple friend request responses, e.g., a first friend request response 512a from the first friend node 504 and a second friend request response 512b from the second friend node 506. Each of the friend request responses 512a, 512b may include information such as, e.g., a size of the cache at the respective friend node 504, 506.

The LPN 502 may determine (at 514) with which of the friend nodes to establish a message caching friendship based at least in part on the size of the available cache (e.g., the number of messages that may be maintained for the LPN 502). In the example illustrated in FIG. 5, the cache size of the first friend node 504 may be larger than the second friend node 506, and hence, the LPN 502 may select the first friend node 504 for a message caching friendship. Optionally, the LPN 502 may send an accept message 516 to the first friend node 504 indicating that the first friend node 504 may maintain messages for the LPN 502, and the first friend node 504 may send an ACK 518 to the LPN 502 indicating that the message caching friendship is established.

In the example illustrated in FIG. 5, the first friend node 504 has maintained two messages 501g, 501h associated with address 2 (e.g., for element 2 503b), and storage areas 501a-501g are unused. Upon receipt of a new incoming message 501i (e.g., that includes address3 associated with element 3 503c), the first friend node 504 may determine (at 520) whether to maintain the new incoming message 501i based at least in part on the message address (e.g., address3) and the information included in the Smart Friend Cache Request 526 (e.g., see Table 1 above). In the example illustrated in FIG. 5, the first friend node 504 may determine not to maintain the new incoming message 501i because the message address included in the new incoming message 501i is not address1 or address2 (e.g., as indicated in the Smart Friend Cache Request 526).

In scenarios in which the cache is full (e.g., when all storage areas 501a-501h maintain messages for the LPN 502), the first friend node 504 may determine whether a new incoming message includes an element address of the higher priority. When the new incoming message includes an element address of the higher priority, the first friend node 504 may discard, e.g., the oldest maintained message that is of a lower priority in order to maintain the new incoming message.

Upon transitioning to the operational mode, the LPN 502 may transmit at least one polling request message 522a-522b and receive a polling response message 524a-524b in response to each of the polling request messages 522a-522b. In other words, in the example illustrated in FIG. 5, the LPN 502 may transmit two polling messages before receiving the cached message(s) of higher importance (e.g., message2). Alternatively, a single polling request message may be transmitted by the LPN 502, and all of the cached messages may be received by the LPN 502 in response to the single polling request message.

By using the technique described in connection with FIGS. 5-11, an LPN 502 of the present disclosure may reduce the amount of power consumed sending polling requests until the most important cached message(s) are received. In addition, the first friend node 504 may utilize less of its storage space while caching messages for the LPN 502.

Figure 6:
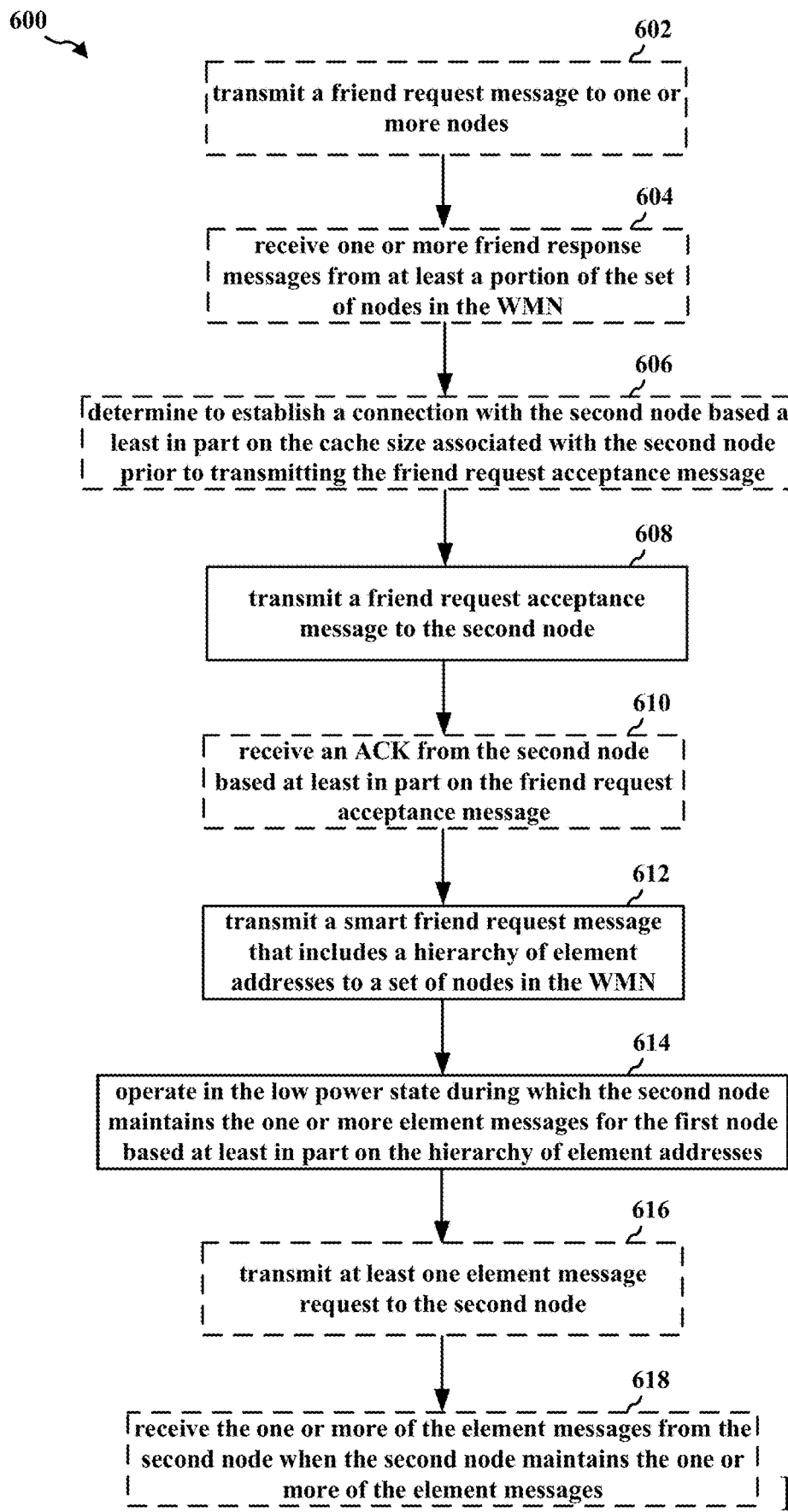
FIG. 6 is a flowchart of a method of wireless communication.

FIG. 6 is a flowchart 600 of a method of wireless communication. The method may be performed by a first node (e.g., the mesh node 102, mesh client device 104, wireless device 200, LPN 302, 402, 502, the second node 1050, the apparatus 702/702'). The first node may include a plurality of elements, and each of the plurality of elements may be associated with a different element address. In FIG. 6, optional operations may be indicated with dashed lines.

At 602, the first node may transmit a friend request message to a set of nodes in the wireless mesh network. For example, referring to FIG. 5, in order to establish a message caching friendship, the LPN 502 may transmit a friendship request message 510. As described above in connection with FIGS. 3 and 4, the friendship request message 510 may be used to establish a friendship with another node in WMN 500.

At 604, the first node may receive one or more friend response messages from at least a portion of the set of nodes in the wireless mesh network. In certain aspects, each of the one or more friend response messages may indicate a cache size. In certain other aspects, the second node may be included in the set of nodes. For example, referring to FIG. 5, in response to the friendship request message 510, the LPN 502 may receive multiple friend request responses, e.g., a first friend request response 512a from the first friend node 504 and a second friend request response 512b from the second friend node 506. Each of the friend request responses 512a, 512b may include information such as, e.g., a size of the cache at the respective friend nodes 504, 506.

At 606, the first node may determine to establish a connection with the second node based at least in part on the cache size associated with the second node prior to transmitting the friend request acceptance message. For example, referring to FIG. 5, the LPN 502 may determine (at 514) with which of the friend nodes to establish a message caching friendship based at least in part on the size of the cache (e.g., the number of messages that may be maintained for the LPN 502). In the example illustrated in FIG. 5, the cache size of the first friend node 504 may be larger than the second friend node 506, and hence, the LPN 502 may select the first friend node 504 to establish a message caching friendship.

At 608, the first node may transmit a friend request acceptance message to the second node. For example, referring to FIG. 5, the LPN 502 may send an accept message 516 to the first friend node 504 indicating that the first friend node 504 may maintain messages for the LPN 502.

At 610, the first node may receive an ACK from the second node based at least in part on the friend request acceptance message. For example, referring to FIG. 5, the first friend node 504 may send an ACK 518 that is received by the LPN 502 and indicates that the message caching friendship is established.

At 612, the first node may transmit a smart friend request message to a set of nodes in the wireless mesh network. In certain aspects, the set of nodes may be associated with a friend feature that includes maintaining one or more element messages intended for the first node when the first node is in a low power mode. In certain other aspects, each of the one or more element messages intended for the first node may include an element address corresponding to one of the plurality of elements at the first node. In certain other aspects, the smart friend request message may indicate at least in part a hierarchy of element addresses such that a second node maintains the one or more elements messages for the first node based at least in part on the hierarchy of element addresses. In certain other aspects, the smart friend request message may further indicate a number of element messages to maintain for each of element addresses associated with the first node. For example, referring to FIG. 5, once a friendship is established, the LPN 502 may send a separate Smart Friend Cache Request 526 to the node with which a friendship has been established (e.g., first friend node 504 in FIG. 5). In certain other implementations, the Smart Friend Cache Request 526 may be used to establish a friendship with one of the other nodes and to indicate a hierarchy of messages to maintain to the first friend node 504 and the second friend node 506. When the Smart Friend Cache Request 526 is used to both establish a friendship and to indicate a hierarchy of importance for maintaining messages, the friendship request message 510 may not be transmitted, and instead the Smart Friend Cache Request 526 may be transmitted at operation 602. In either of the above implementations, the LPN 502 may transmit the Smart Friend Cache Request 526 to all of the nodes in the WMN 500 that are configured to maintain messages for the LPN 502 based at least in part on a hierarchy of importance (e.g., "Smart Friend Feature") and/or a number of messages associated with one or more element addresses. In certain aspects, the hierarchy may indicate a single element address for which the LPN 502 wants messages maintained while in a reduced power state. In certain other aspects, the hierarchy may indicate multiple element addresses for which the LPN 502 wants messages maintained while in a reduced power state. In certain other aspects, the hierarchy may indicate a priority of element addresses for which the LPN 502 wants messages maintained while in a reduced power state when a maximum number of messages is maintained by the friend node (e.g., discard address2 message for address1 message). The Smart Friend Cache Request 526 may include information about the element address(es) for which the friend node may maintain messages, and/or a number of messages to be maintained for each of the element address(es). A non-limiting example of the information included in the Smart Friend Cache Request 526 is seen above in Table 1.

At 614, the first node may operate in the low power state during which the second node maintains the one or more element messages for the first node based at least in part on the hierarchy of element addresses. For example, referring to FIG. 5, when the LPN 502 operates in a low power mode, the first friend node 504 may maintain messages for the LPN 502.

At 616, the first node may transmit at least one element message request to the second node. In certain aspects, the at least one element message request may be transmitted during an operational state of the first node. For example, referring to FIG. 5, upon transitioning to the operational mode, the LPN 502 may transmit a polling request message 522a-522b.

At 618, the first node may receive one or more element messages from the second node when the second node maintains the one or more element messages. For example, referring to FIG. 5, the LPN 502 may receive a polling response message 524a-524b in response to each of the polling request messages 522a-522b from the first friend node 504.

Figure 7:
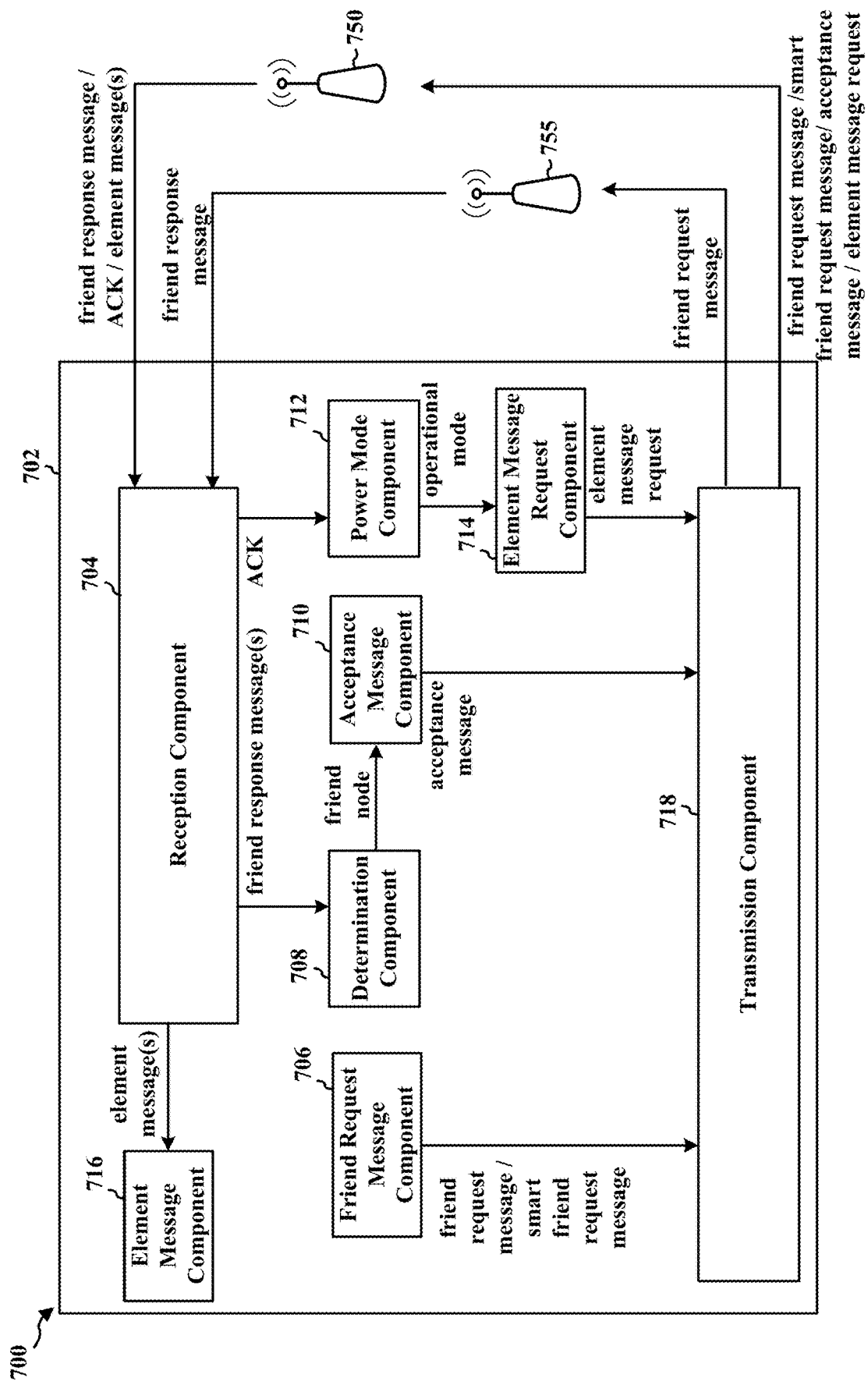
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a first node (e.g., the mesh node 102, mesh client device 104, wireless device 200, LPN 302, 402, 502, the second node 1050, the apparatus 702') in communication with a second node 750 (e.g., the mesh node 102, mesh client device 104, the wireless device 200, first friend node 304, 504, friend node 404, the apparatus 1002/1002') and a third node 755 (e.g., the mesh node 102, mesh client device 104, the wireless device 200, second friend node 306, 506, third node 1055). The apparatus may include a reception component 704, a friend request message component 706, a determination component 708, an acceptance message component 710, a power mode component 712, an element message request component 714, an element message component 716, and a transmission component 718.

The friend request message component 706 may be configured to generate a friend message request and/or a smart friend request message. In certain other aspects, the smart friend request message may indicate at least in part a hierarchy of element addresses such that a second node maintains the one or more elements messages for the first node based at least in part on the hierarchy of element addresses. In certain other aspects, the smart friend request message may further indicate a number of element messages to maintain for each of element addresses associated with the first node. The friend request message component 706 may be configured to send the friend request message to the transmission component 718.

The transmission component 718 may be configured to transmit a friend request message and/or smart friend request message to a set of nodes (e.g., the second node 750, the third node 755, etc.) in the wireless mesh network.

The reception component 704 may be configured to receive one or more friend response messages from at least a portion of the set of nodes in the wireless mesh network. In certain aspects, each of the one or more friend response messages may indicate a cache size. The reception component 704 may be configured to send the one or more friend response messages to the determination component 708.

The determination component 708 may be configured to determine to establish a connection with the second node based at least in part on the cache size associated with the second node prior to transmitting the friend request acceptance message. The determination component 708 may be configured to send information associated with the determined and/or selected friend node to the acceptance message component 710.

The acceptance message component 710 may be configured to generate a friend request acceptance message associated with the second node 750. The acceptance message component 710 may be configured to send the friend request acceptance message to the transmission component 718.

The transmission component 718 may be configured to transmit the friend request acceptance message to the second node 750.

The reception component 704 may be configured to receive an ACK from the second node 750 based at least in part on the friend request acceptance message. The reception component 704 may be configured to send the ACK to the power mode component 712.

The power mode component 712 may be configured to operate in the low power state (e.g., upon receipt of the ACK) during which the second node maintains the one or more element messages for the first node based at least in part on the hierarchy of element addresses. Upon transitioning to an operational mode, the power mode component 712 may be configured to send a signal to the element message request component 714.

The element message request component 714 may be configured to generate one or more element message requests that are sent to the transmission component 718.

The transmission component 718 may be configured to transmit at least one element message request to the second node 750. In certain aspects, the at least one element message request may be transmitted during an operational state of the first node.

The reception component 704 may be configured to receive the one or more element messages from the second node 750 when the second node maintains the one or more element messages. The reception component 704 may send the one or more element messages to the element message component 716. The element message component 716 may be configured to process the one or more element message and update any elements associated with the one or more elements.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
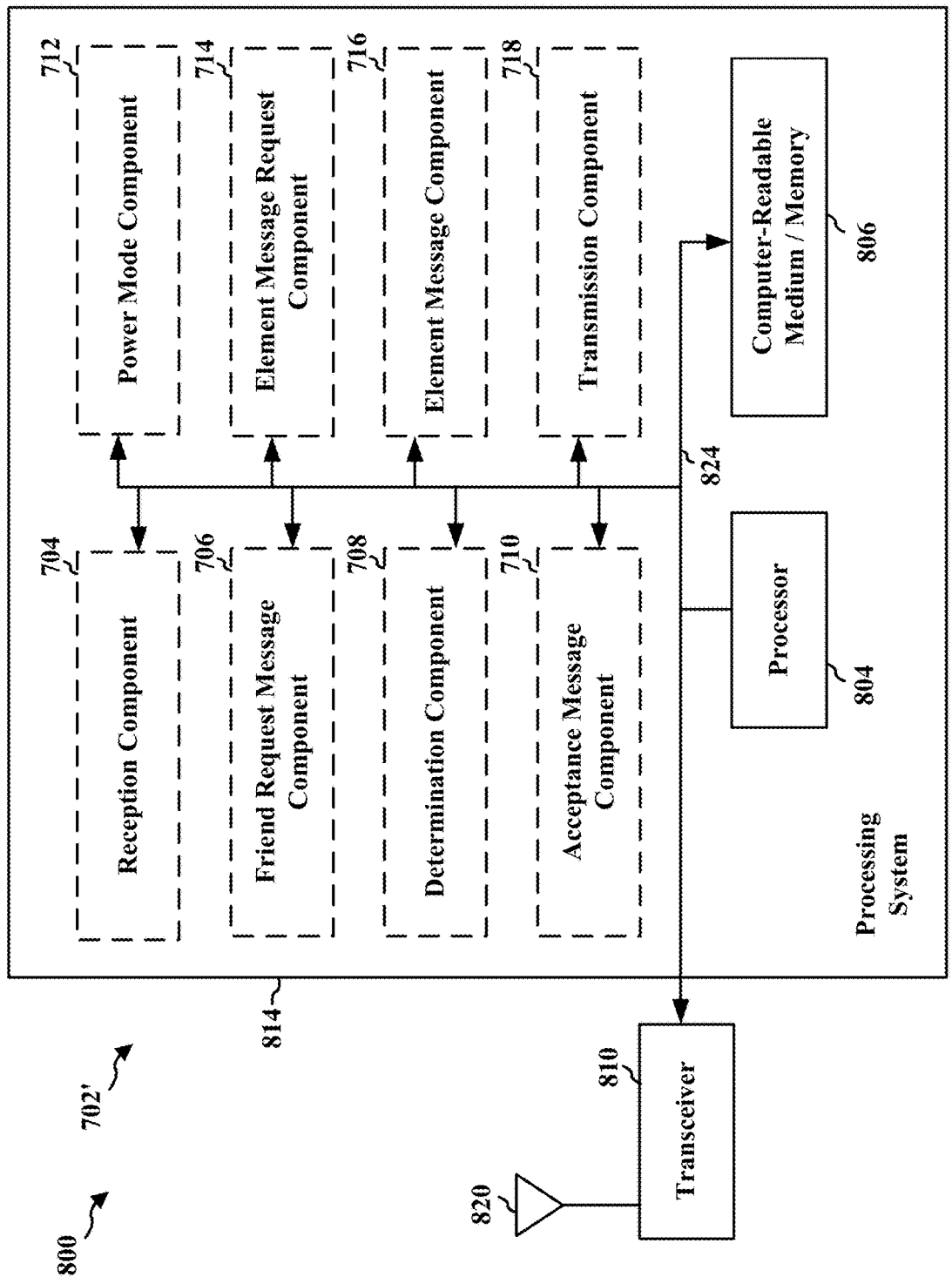
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 718, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718. The components may be software components running in the processor 804, resident/stored in the computer readable medium/memory 806, one or more hardware components coupled to the processor 804, or some combination thereof.

In certain configurations, the apparatus 702/702' for wireless communication may include means for transmitting a friend request message to a set of nodes in the wireless mesh network. In certain configurations, the apparatus 702/702' for wireless communication may include means for transmitting a smart friend request message to a set of nodes in the wireless mesh network. In certain aspects, the set of nodes may be associated with a friend feature that includes maintaining one or more element messages intended for the first node when the first node is in a low power mode. In certain other aspects, each of the one or more element messages intended for the first node may include an element address corresponding to one of the plurality of elements at the first node. In certain other aspects, the smart friend request message may indicate at least in part a hierarchy of element addresses such that a second node maintains the one or more elements messages for the first node based at least in part on the hierarchy of element addresses. In certain other aspects, the smart friend request message may further indicate a number of element messages to maintain for each of element addresses associated with the first node. In certain other configurations, the apparatus 702/702' for wireless communication may include means for receiving one or more friend response messages from at least a portion of the set of nodes in the wireless mesh network. In certain aspects, each of the one or more friend response messages may indicate a cache size. In certain other aspects, the second node being included in the set of nodes. In certain other configurations, the apparatus 702/702' for wireless communication may include means for determining to establish a connection with the second node based at least in part on the cache size associated with the second node prior to transmitting the friend request acceptance message. In certain other configurations, the apparatus 702/702' for wireless communication may include means for transmitting a friend request acceptance message to the second node. In certain other configurations, the apparatus 702/702' for wireless communication may include means for receiving an ACK from the second node based at least in part on the friend request acceptance message. In certain other configurations, the apparatus 702/702' for wireless communication may include means for operating in the low power state during which the second node maintains the one or more element messages for the first node based at least in part on the hierarchy of element addresses. In certain other configurations, the apparatus 702/702' for wireless communication may include means for transmitting at least one element message request to the second node. In certain aspects, the at least one element message request may be transmitted during an operational state of the first node. In certain other configurations, the apparatus 702/702' for wireless communication may include means for receiving the one or more element messages from the second node when the second node maintains the one or more element messages. The aforementioned means may be the processor(s) 202, the radio 230, the MMU 240, the WLAN controller 25, short-range communication controller 252, the WWAN controller 256, one or more of the aforementioned components of the apparatus 702 and/or the processing system 814 of the apparatus 702' configured to perform the functions recited by the aforementioned means.

Figure 9A:
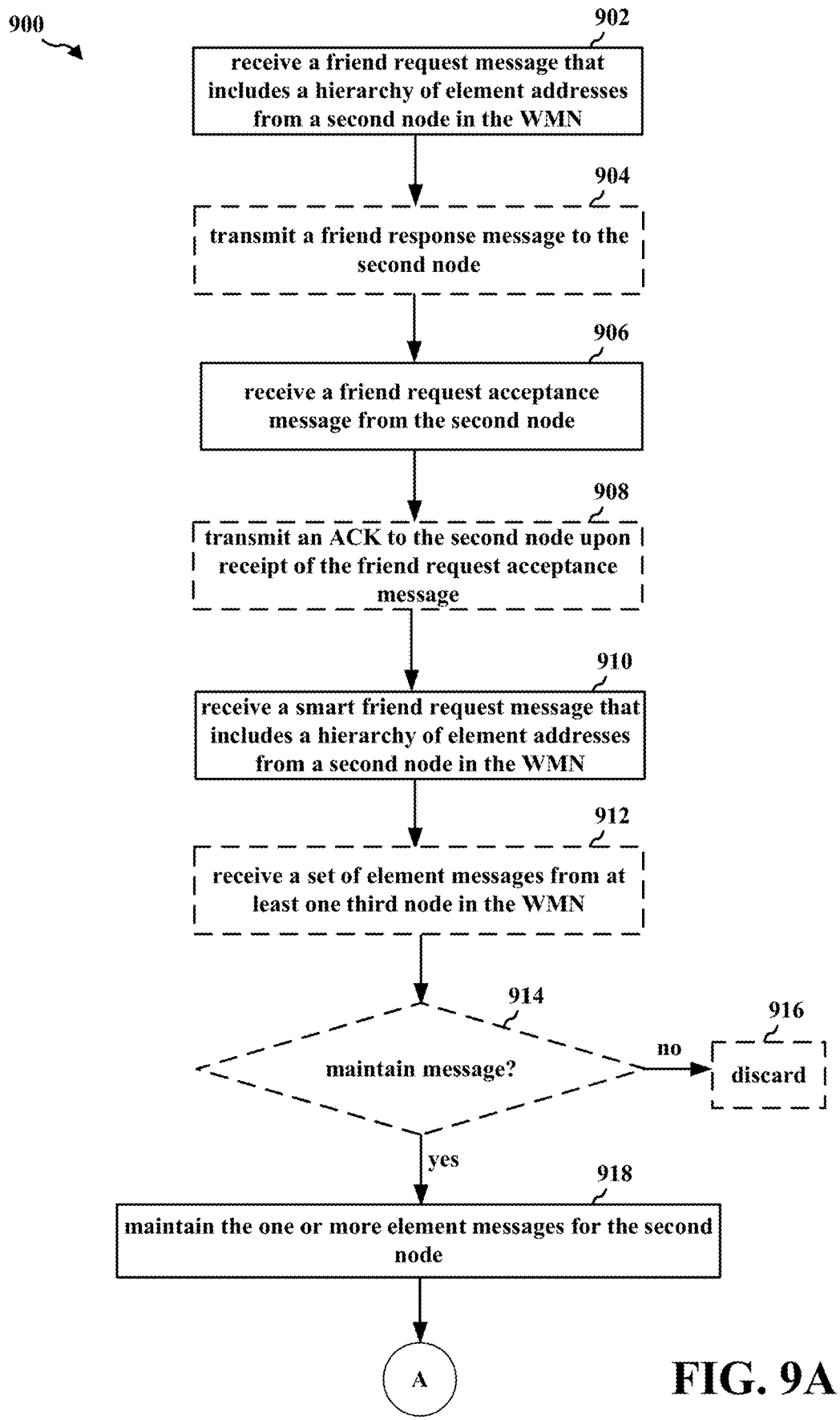
FIGS. 9A and 9B are a flowchart of a method of wireless communication.
Figure 9B:
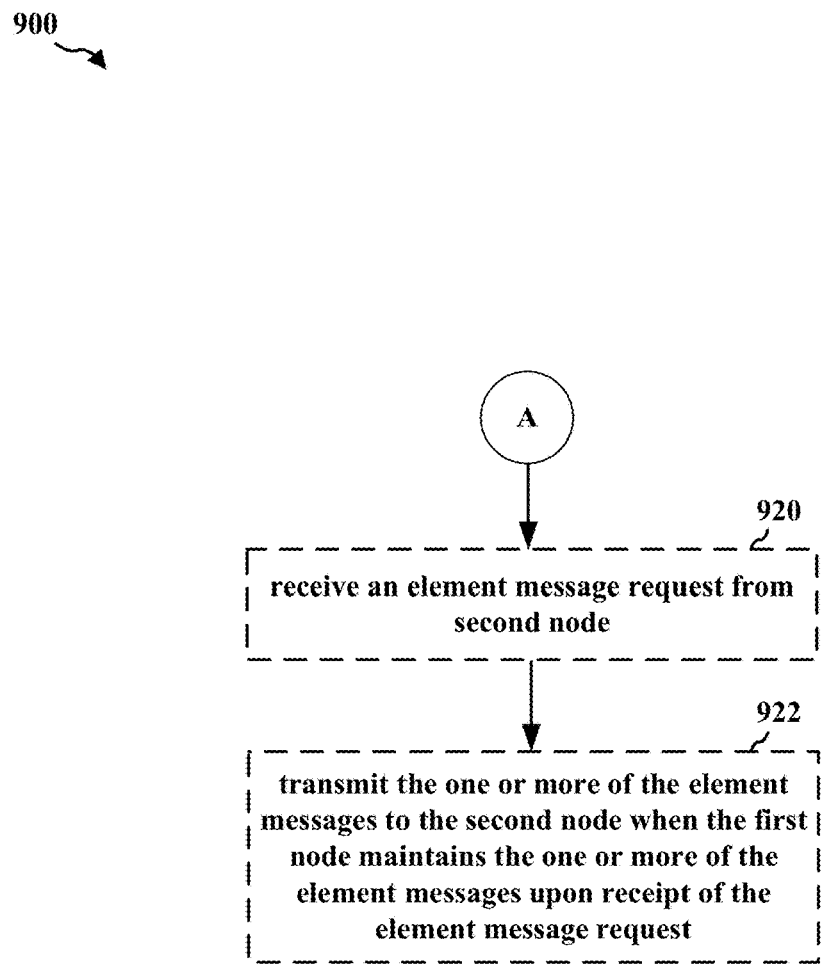

FIGS. 9A and 9B are a flowchart 900 of a method of wireless communication. The method may be performed by a first node (e.g., the mesh node 102, mesh client device 104, wireless device 200, first friend node 304, 504, friend node 404, the second node 750, the apparatus 1002/1002'). In FIGS. 9A and 9B, optional operations may be indicated with dashed lines.

Referring to FIG. 9A, at 902, the first node may receive a friend request message from a second node in the wireless mesh network. For example, referring to FIG. 5, in order to establish a message caching friendship, the LPN 502 may transmit a friendship request message 510. As described above in connection with FIGS. 3 and 4, the friendship request message 510 may be used to establish a friendship with another node in WMN 500.

At 904, the first node may transmit a friend response message to the second node. In certain aspects, the friend response message may indicate a cache size of the first node. For example, referring to FIG. 5, in response to the Smart Friend Cache Request 526, the LPN 502 may receive a first friend request response 512a from the first friend node 504. The friend request responses 512a may include information such as, e.g., a size of the cache at the first friend node 504.

At 906, the first node may receive a friend request acceptance message from the second node. For example, referring to FIG. 5, the LPN 502 may send an accept message 516 that is received by the first friend node 504. The accept message 516 may indicate that the first friend node 504 may maintain messages for the LPN 502.

At 908, the first node may transmit an ACK to the second node upon receipt of the friend request acceptance message. For example, referring to FIG. 5, the first friend node 504 may send an ACK 518 that is received by the LPN 502 and indicates that the message caching friendship is established.

At 910, the first node may receive a smart friend request message from a second node in the wireless mesh network. In certain aspects, the first node may be associated with a friend feature that includes one or more element messages intended for the second node when the second node is in a low power state. In certain other aspects, each of the element messages intended for the second node may include an element address corresponding to one of a plurality of elements at the second node. In certain other aspects, the smart friend request message may indicate at least in part a hierarchy of element addresses such that the first node maintains the one or more elements messages for the second node based at least in part on the hierarchy of element addresses. In certain other aspects, the smart friend request message may further indicate a number of element messages to maintain for each element address associated with the second node. For example, referring to FIG. 5, once a friendship is established, the LPN 502 may send a separate Smart Friend Cache Request 526 to the node with which a friendship has been established (e.g., first friend node 504 in FIG. 5). In certain other implementations, the Smart Friend Cache Request 526 may be used to establish a friendship with one of the other nodes and to indicate a hierarchy of messages to maintain to the first friend node 504 and the second friend node 506. When the Smart Friend Cache Request 526 is used to both establish a friendship and to indicate a hierarchy of importance for maintaining messages, the friendship request message 510 may not be transmitted, and instead the Smart Friend Cache Request 526 may be received at operation 902. In either of the above implementations, the LPN 502 may transmit the Smart Friend Cache Request 526 to all of the nodes in the WMN 500 that are configured to maintain messages for the LPN 502 based at least in part on a hierarchy of importance (e.g., "Smart Friend Feature") and/or a number of messages associated with one or more element addresses. In certain aspects, the hierarchy may indicate a single element address for which the LPN 502 wants messages maintained while in a reduced power state. In certain other aspects, the hierarchy may indicate multiple element addresses for which the LPN 502 wants messages maintained while in a reduced power state. In certain other aspects, the hierarchy may indicate a priority of element addresses for which the LPN 502 wants messages maintained while in a reduced power state when a maximum number of messages is maintained by the friend node (e.g., discard address2 message for address1 message). The Smart Friend Cache Request 526 may include information about the element address(es) for which the friend node may maintain messages, and/or a number of messages to be maintained for each of the element address(es). A non-limiting example of the information included in the Smart Friend Cache Request 526 is seen above in Table 1.

At 912, the first node may receive a set of element messages from at least one third node in the wireless mesh network. In certain aspects, the set of element messages may be intended for the first node. In certain other aspects, the set of element messages may each include at least one element address associated with the first node. For example, referring to FIG. 5, the first friend node 504 may receive a new incoming message 501*i* from the second friend node 506.

At 914, the first node may determine whether to maintain a portion of the set of element messages based at least in part on the hierarchy of element addresses indicated in the friend request message. For example, referring to FIG. 5, upon receipt of a new incoming message 501*i* (e.g., that includes address3 associated with element 3 503*c*), the first friend node 504 may determine (at 520) whether to maintain the new incoming message 501*i* based at least in part on the message address (e.g., address3) and the information included in the Smart Friend Cache Request 526 (e.g., see Table 1). In the example illustrated in FIG. 5, the first friend node 504 may determine not to maintain the new incoming message 501*i* because the message address included in the new incoming message 501*i* is not address1 or address2 (e.g., as indicated in the Smart Friend Cache Request 526).

Upon determining not to maintain the one or more element messages, the operation may proceed to 916. Conversely, upon determining to maintain the one or more element messages, the operation may proceed to 918.

At 918, the first node may maintain the one or more element messages for the second node based at least in part on the hierarchy of element addresses. In the example illustrated in FIG. 5, the first friend node 504 has maintained two messages associated with address 2 (e.g., for element 2 503*b*).

Referring to FIG. 9B, at 920, the first node may receive an element message request from second node. In certain aspects, the element message request may be received during an operational state of the second node. For example, referring to FIG. 5, upon transitioning to the operational mode, the LPN 502 may transmit a polling request message 522*a*-522*b* that is received by the first friend node 504.

At 922, the first node may transmit the one or more element messages to the second node when the first node maintains the one or more element messages upon receipt of the element message request. For example, referring to FIG. 5, the first friend node 504 may transmit a polling response message 524*a*-524*b* in response to each of the polling request messages 522*a*-522*b* received from the LPN 502.

Figure 10:
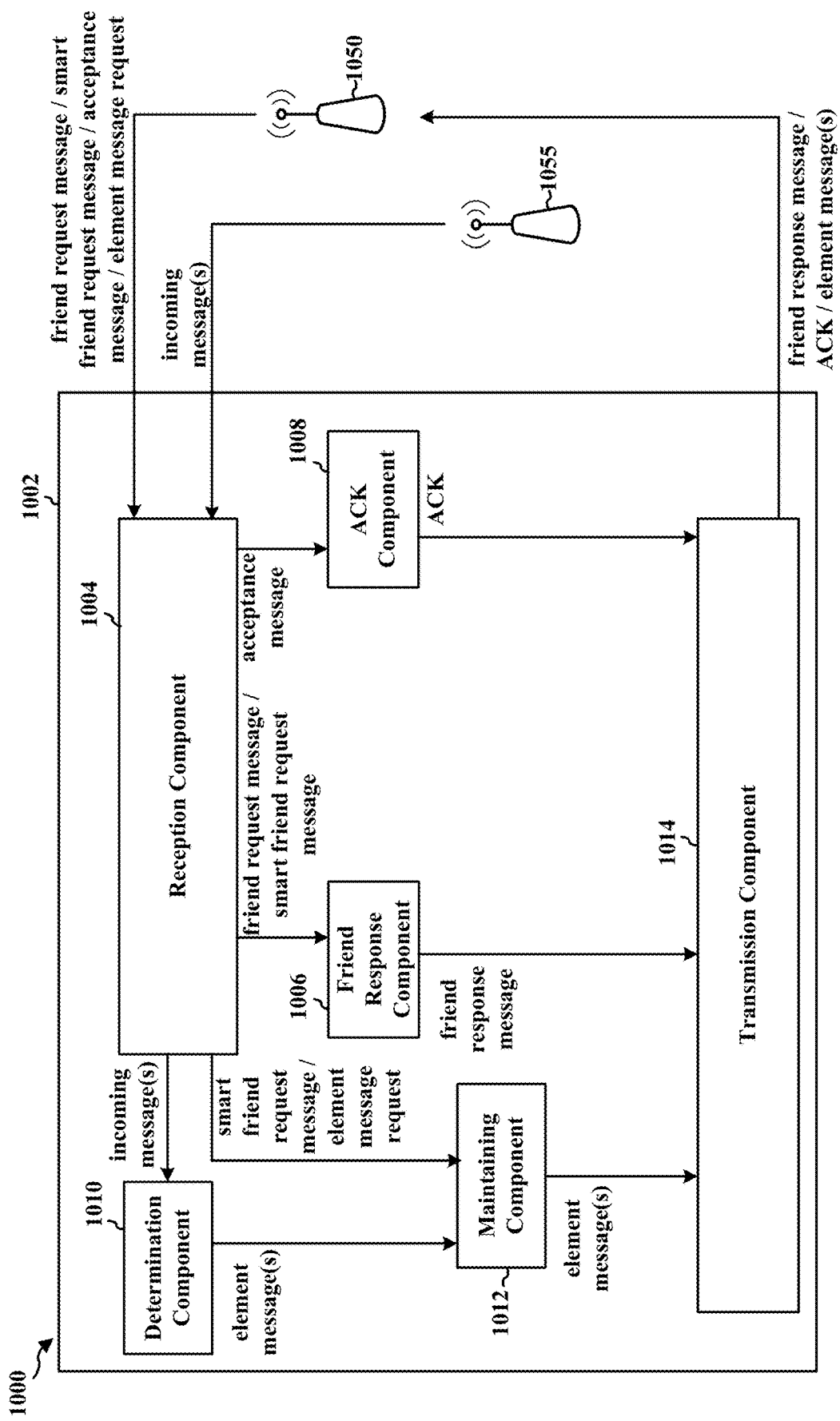
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a first node (e.g., the mesh node 102, mesh client device 104, wireless device 200, first friend node 304, 504, friend node 404, the second node 750, the apparatus 1002/1002') in communication with a second node 1050 (e.g., the mesh node 102, mesh client device 104, wireless device 200, LPN 302, 402, 502, the second node 1050, the apparatus 702/702') and a third node 1055 (e.g., the mesh node 102, mesh client device 104, wireless device 200, first friend node 304, 504, friend node 404, the third node 755). The apparatus may include a reception component 1004, a friend response component 1006, an ACK component 1008, a determination component 1010, a maintaining component 1012, and a transmission component.

The reception component 1004 may be configured to receive a friend request message from the second node 1050. The reception component 1004 may be configured to receive a smart friend request message from the second node 1050 in the wireless mesh network. In certain aspects, the first node may be associated with a friend feature that includes one or more element messages intended for the second node when the second node is in a low power state. In certain other aspects, each of the element messages intended for the second node may include an element address corresponding to one of a plurality of elements at the second node. In certain other aspects, the smart friend request message may indicate at least in part a hierarchy of element addresses such that the first node maintains the one or more elements messages for the second node based at least in part on the hierarchy of element addresses. In certain other aspects, the smart friend request message may further indicate a number of element messages to maintain for each of element addresses associated with the second node. The reception component 1004 may be configured to send the friend request message and/or the smart friend request message to the friend response component 1006 and/or the maintaining component 1012.

The friend response component 1006 may be configured to generate a friend response that includes information, e.g., such as cache size. The friend response component 1006 may be configured to send the friend response to the transmission component 1014.

The transmission component 1014 may be configured to transmit the friend response message to the second node 1050.

The reception component 1004 may be configured to receive a friend request acceptance message from the second node 1050. The reception component 1004 may be configured to send the friend request acceptance message to the ACK component 1008.

The ACK component 1008 may be configured to generate an ACK associated with the friend request acceptance message, and send the ACK to the transmission component 1014.

The transmission component 1014 may be configured to transmit the ACK to the second node 1050 upon receipt of the friend request acceptance message.

The reception component 1004 may be configured to receive one or more element messages from the third node 1055, and send the one or more element messages to the determination component 1010 and/or the maintaining component 1012.

The maintaining component 1012 may be configured to maintain the one or more element messages for the second node 1050 by receiving a set of element messages from at least one third node 1055 (e.g., via the reception component 1004) in the wireless mesh network. In certain aspects, the set of element messages may be intended for the first node. In certain other aspects, the set of element messages may each include at least one element address associated with the first node (e.g., the apparatus 1002).

In certain configurations, the determination component 1010 may be configured to determine whether to maintain a portion of the set of element messages based at least in part on the hierarchy of element addresses indicated in the friend request message. The determination component 1010 may be configured to send the element message(s) to be maintained to the maintaining component 1012.

The reception component 1004 may be configured to receive an element message request from second node 1050. In certain aspects, the element message request may be received during an operational state of the second node 1050. The reception component 1004 may be configured to send the element message request to the maintaining component 1012.

The maintaining component 1012 may be configured to send the one or more element message(s) to the transmission component 1014. The transmission component 1014 may be configured to transmit the one or more element messages to the second node 1050 when the first node maintains the one or more element messages upon receipt of the element message request.

The apparatus may include additional components that perform each of the blocks of the algorithm in the aforementioned flowcharts of FIGS. 9A and 9B. As such, each block in the aforementioned flowcharts of FIGS. 9A and 9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
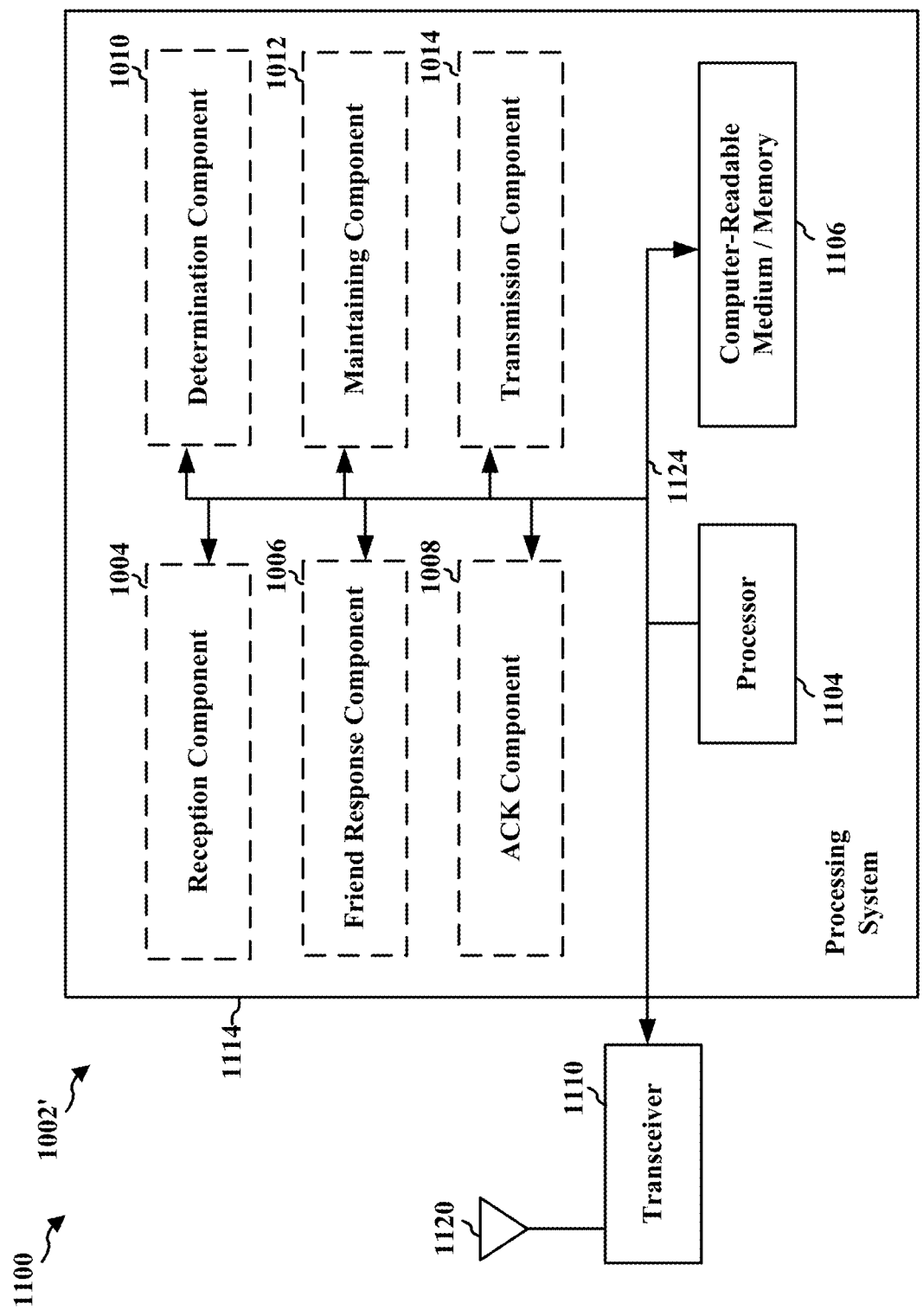
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof.

In certain configurations, the apparatus 1002/1002' for wireless communication may include means for receiving a friend request message from a second node in the wireless mesh network. In certain aspects, the first node may be associated with a friend feature that includes one or more element messages intended for the second node when the second node is in a low power state. In certain other aspects, each of the element messages intended for the second node may include an element address corresponding to one of a plurality of elements at the second node. In certain other aspects, the friend request message may indicate at least in part a hierarchy of element addresses such that the first node maintains the one or more elements messages for the second node based at least in part on the hierarchy of element addresses. In certain other aspects, the friend request message may further indicate a number of element messages to maintain for each of element addresses associated with the second node. In certain other configurations, the apparatus 1002/1002' for wireless communication may include means for transmitting a friend response message to the second node. In certain aspects, the friend response message may indicate a cache size of the first node. In certain other configurations, the apparatus 1002/1002' for wireless communication may include means for receiving a friend request acceptance message from the second node. In certain other configurations, the apparatus 1002/1002' for wireless communication may include means for transmitting an ACK to the second node upon receipt of the friend request acceptance message. In certain other configurations, the apparatus 1002/1002' for wireless communication may include means for maintaining the one or more element messages for the second node based at least in part on the hierarchy of element addresses. In certain other configurations, the apparatus 1002/1002' for wireless communication may include means for receiving a set of element messages from at least one third node in the wireless mesh network, the set of element messages being intended for the first node. In certain aspects, the set of element messages may be intended for the first node. In certain other configurations, the apparatus 1002/1002' for wireless communication may include means for determining whether to maintain a portion of the set element messages based at least in part on the hierarchy of element addresses indicated in the smart friend request message. In certain other configurations, the apparatus 1002/1002' for wireless communication may include means for receiving an element message request from second node. In certain aspects, the element message request may be received during an operational state of the second node. In certain other configurations, the apparatus 1002/1002' for wireless communication may include means for transmitting the one or more element messages to the second node when the first node maintains the one or more element messages upon receipt of the element message request. The aforementioned means may be the processor(s) 202, the radio 230, the MMU 240, the WLAN controller 250, short-range communication controller 252, the WWAN controller 256, one or more of the aforementioned components of the apparatus 1002 and/or the processing system 1114 of the apparatus 1002' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first node in a wireless mesh network, the first node including a plurality of elements, each of the plurality of elements being associated with a different element address, the method comprising:
   transmitting a smart friend request message to a set of nodes in the wireless mesh network,
      the set of nodes being associated with a friend feature that includes maintaining one or more element messages intended for the first node when the first node is in a low power state,
      each of the one or more element messages intended for the first node including an element address corresponding to one of the plurality of elements at the first node, and
      the smart friend request message indicating at least in part a hierarchy of element addresses such that a second node maintains the one or more element messages for the first node based at least in part on the hierarchy of element addresses;
   operating in the low power state during which the second node maintains the one or more element messages for the first node based at least in part on the hierarchy of element addresses; and
   wherein the smart friend request message further indicates a number of element messages to maintain for each element address associated with the first node.

2. The method of claim 1, further comprising:
   transmitting at least one element message request to the second node, the at least one element message request being transmitted during an operational state of the first node; and
   receiving the one or more element messages from the second node when the second node maintains the one or more element messages.

3. A method of wireless communication of a first node in a wireless mesh network, the method comprising:
   receiving a smart friend request message from a second node in the wireless mesh network,
      the first node being associated with a friend feature that includes one or more element messages intended for the second node when the second node is in a low power state,
      each of the element messages intended for the second node including an element address corresponding to one of a plurality of elements at the second node, and
      the smart friend request message indicating at least in part a hierarchy of element addresses such that the first node maintains the one or more elements messages for the second node based at least in part on the hierarchy of element addresses;
   maintaining the one or more element messages for the second node based at least in part on the hierarchy of element addresses; and
   wherein the smart friend request message further indicates a number of element messages to maintain for each of element addresses associated with the second node.

4. The method of claim 3, further comprising:
   receiving a set of element messages from at least one third node in the wireless mesh network, the set of element messages being intended for the first node, and the set of element messages each including at least one element address associated with the first node; and
   determining whether to maintain a portion of the set of element messages based at least in part on the hierarchy of element addresses indicated in the smart friend request message.

5. The method of claim 3, further comprising:
   receiving an element message request from the second node, the element message request being received during an operational state of the second node; and
   transmitting the one or more element messages to the second node when the first node maintains the one or more element messages upon receipt of the element message request.

6. An apparatus for wireless communication of a first node in a wireless mesh network, the first node including a plurality of elements, each of the plurality of elements being associated with a different element address, the apparatus comprising:
   means for transmitting a smart friend request message to a set of nodes in the wireless mesh network, the set of nodes being associated with a friend feature that includes maintaining one or more element messages intended for the first node when the first node is in a low power state, each of the one or more element messages intended for the first node including an element address corresponding to one of the plurality of elements at the first node, and the smart friend request message indicating at least in part a hierarchy of element addresses such that a second node maintains the one or more elements messages for the first node based at least in part on the hierarchy of element addresses;

means for operating in the low power state during which the second node maintains the one or more element messages for the first node based at least in part on the hierarchy of element addresses; and wherein the smart friend request message further indicates a number of element messages to maintain for each of element addresses associated with the first node.

7. The apparatus of claim 6, further comprising:

means for transmitting at least one element message request to the second node, the at least one element message request being transmitted during an operational state of the first node; and means for receiving the one or more element messages from the second node when the second node maintains the one or more element messages.

8. An apparatus for wireless communication of a first node in a wireless mesh network, the apparatus comprising:

means for receiving a smart friend request message from a second node in the wireless mesh network, the first node being associated with a friend feature that includes one or more element messages intended for the second node when the second node is in a low power state, each of the element messages intended for the second node including an element address corresponding to one of a plurality of elements at the second node, and the smart friend request message indicating at least in part a hierarchy of element addresses such that the first node maintains the one or more elements messages for the second node based at least in part on the hierarchy of element addresses;

means for maintaining the one or more element messages for the second node based at least in part on the hierarchy of element addresses; and wherein the smart friend request message further indicates a number of element messages to maintain for each of element addresses associated with the second node.

9. The apparatus of claim 8, further comprising:

means for receiving a set of element messages from at least one third node in the wireless mesh network, the set of element messages being intended for the first node, and the set of element messages each including at least one element address associated with the first node; and means for determining whether to maintain a portion of the set of element messages based at least in part on the hierarchy of element addresses indicated in the smart friend request message.

10. The apparatus of claim 8, further comprising:

means for receiving an element message request from second node, the element message request being received during an operational state of the second node; and means for transmitting the one or more of the element messages to the second node when the first node maintains the one or more element messages upon receipt of the element message request.

11. An apparatus for wireless communication of a first node in a wireless mesh network, the first node including a plurality of elements, each of the plurality of elements being associated with a different element address, the apparatus comprising:

a memory; and at least one processor coupled to the memory and configured to:

transmit a smart friend request message to a set of nodes in the wireless mesh network, the set of nodes being associated with a friend feature that includes maintaining one or more element messages intended for the first node when the first node is in a low power state, each of the one or more element messages intended for the first node including an element address corresponding to one of the plurality of elements at the first node, and the smart friend request message indicating at least in part a hierarchy of element addresses such that a second node maintains the one or more elements messages for the first node based at least in part on the hierarchy of element addresses;

operate in the low power state during which the second node maintains the one or more element messages for the first node based at least in part on the hierarchy of element addresses; and wherein the smart friend request message further indicates a number of element messages to maintain for each of element addresses associated with the first node.

12. The apparatus of claim 11, wherein the at least one processor is further configured to:

transmit at least one element message request to the second node, the at least one element message request being transmitted during an operational state of the first node; and receive the one or more element messages from the second node when the second node maintains the one or more element messages.

13. An apparatus for wireless communication of a first node in a wireless mesh network, the apparatus comprising:

a memory; and at least one processor coupled to the memory and configured to:

receive a smart friend request message from a second node in the wireless mesh network, the first node being associated with a friend feature that includes one or more element messages intended for the second node when the second node is in a low power state, each of the element messages intended for the second node including an element address corresponding to one of a plurality of elements at the second node, and the smart friend request message indicating at least in part a hierarchy of element addresses such that the first node maintains the one or more elements messages for the second node based at least in part on the hierarchy of element addresses;

maintain the one or more element messages for the second node based at least in part on the hierarchy of element addresses; and wherein the smart friend request message further indicates a number of element messages to maintain for each of element addresses associated with the second node.

14. The apparatus of claim 13, wherein the at least one processor is further configured to:
receive a set of element messages from at least one third node in the wireless mesh network, the set of element messages being intended for the first node, and the set of element messages each including at least one element address associated with the first node; and
determine whether to maintain a portion of the set of element messages based at least in part on the hierarchy of element addresses indicated in the smart friend request message.

15. The apparatus of claim 13, wherein the at least one processor is further configured to:
receive an element message request from second node, the element message request being received during an operational state of the second node; and
transmit the one or more of the element messages to the second node when the first node maintains the one or more element messages upon receipt of the element message request.

16. A non-transitory computer-readable medium storing computer executable code of a first node in a wireless mesh network, the first node including a plurality of elements, each of the plurality of elements being associated with a different element address, comprising code to:
transmit a smart friend request message to a set of nodes in the wireless mesh network,
the set of nodes being associated with a friend feature that includes maintaining one or more element messages intended for the first node when the first node is in a low power state,
each of the one or more element messages intended for the first node including an element address corresponding to one of the plurality of elements at the first node, and
the smart friend request message indicating at least in part a hierarchy of element addresses such that a second node maintains the one or more elements messages for the first node based at least in part on the hierarchy of element addresses;
operate in the low power state during which the second node maintains the one or more element messages for the first node based at least in part on the hierarchy of element addresses; and
wherein the smart friend request message further indicates a number of element messages to maintain for each of element addresses associated with the first node.

17. The non-transitory computer-readable medium of claim 16, further comprising code to:
transmit at least one element message request to the second node, the at least one element message request being transmitted during an operational state of the first node; and
receive the one or more element messages from the second node when the second node maintains the one or more element messages.

18. A non-transitory computer-readable medium storing computer executable code of a first node in a wireless mesh network, comprising code to:
receive a smart friend request message from a second node in the wireless mesh network,
the first node being associated with a friend feature that includes one or more element messages intended for the second node when the second node is in a low power state,
each of the element messages intended for the second node including an element address corresponding to one of a plurality of elements at the second node, and
the smart friend request message indicating at least in part a hierarchy of element addresses such that the first node maintains the one or more elements messages for the second node based at least in part on the hierarchy of element addresses;
maintain the one or more element messages for the second node based at least in part on the hierarchy of element addresses; and
wherein the smart friend request message further indicates a number of element messages to maintain for each of element addresses associated with the second node.

19. The non-transitory computer-readable medium of claim 18, further comprising code to:
receive a set of element messages from at least one third node in the wireless mesh network, the set of element messages being intended for the first node, and the set of element messages each including at least one element address associated with the first node; and
determine whether to maintain a portion of the set of element messages based at least in part on the hierarchy of element addresses indicated in the smart friend request message.

20. The non-transitory computer-readable medium of claim 18, further comprising code to:
receive an element message request from second node, the element message request being received during an operational state of the second node; and
transmit the one or more of the element messages to the second node when the first node maintains the one or more element messages upon receipt of the element message request.

* * * * *